United States Patent [19]

Clausen

[11] Patent Number: 4,936,418

[45] Date of Patent: Jun. 26, 1990

[54] OIL DRIP COLLECTOR

[76] Inventor: Ronald A. Clausen, 1853 8th Ave. SE., Rochester, Minn. 55904

[21] Appl. No.: 371,839

[22] Filed: Jun. 27, 1989

[51] Int. Cl.⁵ .......................................... F16N 31/00
[52] U.S. Cl. ..................................... 184/106; 180/69.1
[58] Field of Search ........................ 184/106; 180/69.1

[56] References Cited

U.S. PATENT DOCUMENTS

| | | | |
|---|---|---|---|
| 1,630,639 | 5/1927 | Taylor | 184/106 |
| 2,732,024 | 1/1956 | Schonwald | 180/69.1 |
| 2,783,848 | 3/1957 | Beskid | 180/69.1 |
| 2,986,235 | 5/1961 | Weibert | 180/69.1 |
| 3,651,884 | 3/1972 | Dorries . | |
| 3,722,626 | 3/1973 | Stack | 184/106 |
| 3,785,451 | 1/1974 | McCord | 180/69.1 |
| 4,084,655 | 4/1978 | Savron . | |
| 4,695,088 | 9/1987 | Jensen . | |
| 4,798,754 | 1/1989 | Tomek | 184/106 |

Primary Examiner—Carroll B. Dority
Attorney, Agent, or Firm—Leon Gilden

[57] ABSTRACT

An oil drip collector is set forth formed of an elongate oval-figured flexible sheet-like member including a series of opposed spring-biased clips for securement about an associated automobile. The collector is positioned underlying the automobile and is formed with a reinforced perimeter with through-extending apertures for receiving the clips therethrough adjacent the perimeter. Optionally, an oil gathering rim is provided directed orthogonally of an upper and/or lower surface of a collector with a central sponge member adhesively secured to the sheet for containment of fluid oil directed thereto.

6 Claims, 4 Drawing Sheets

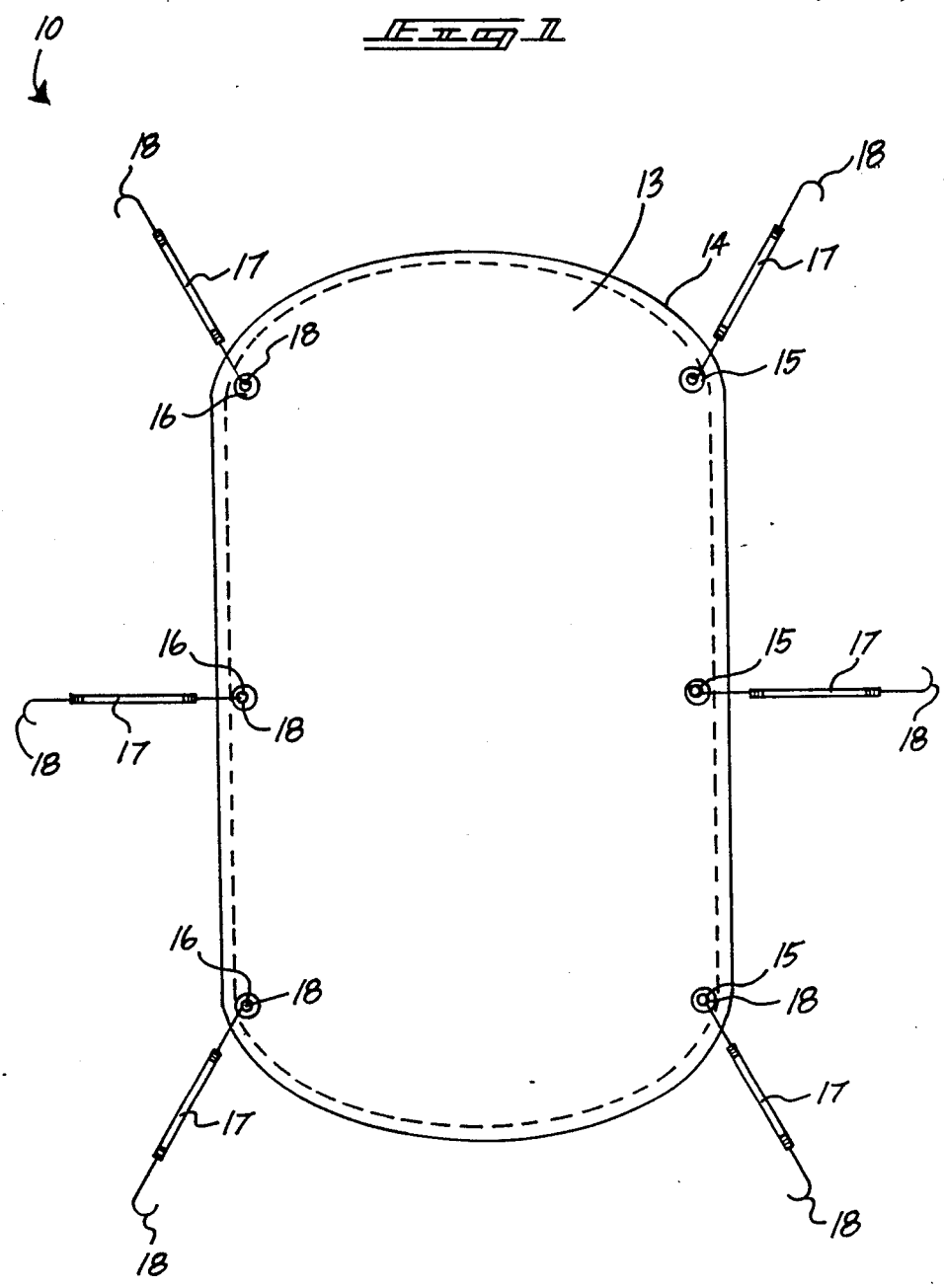

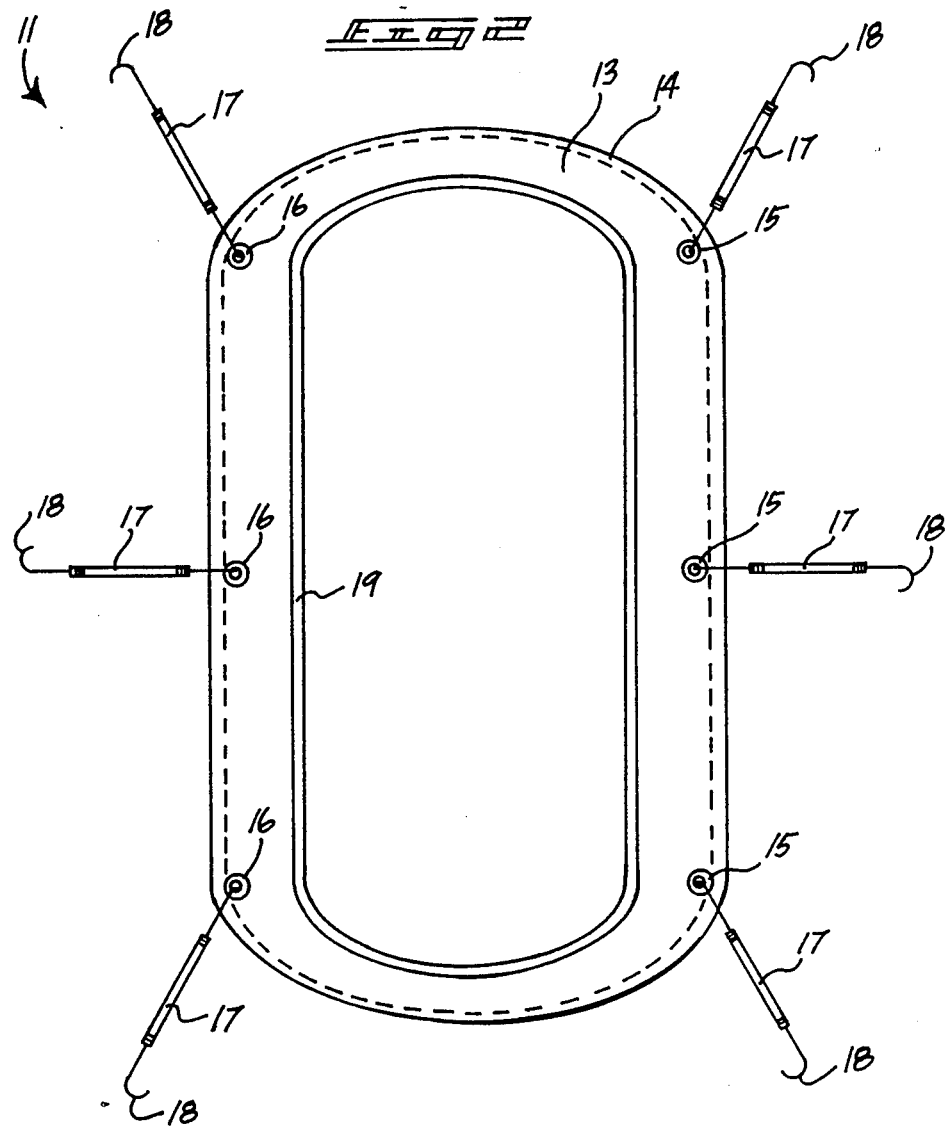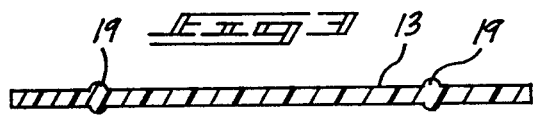

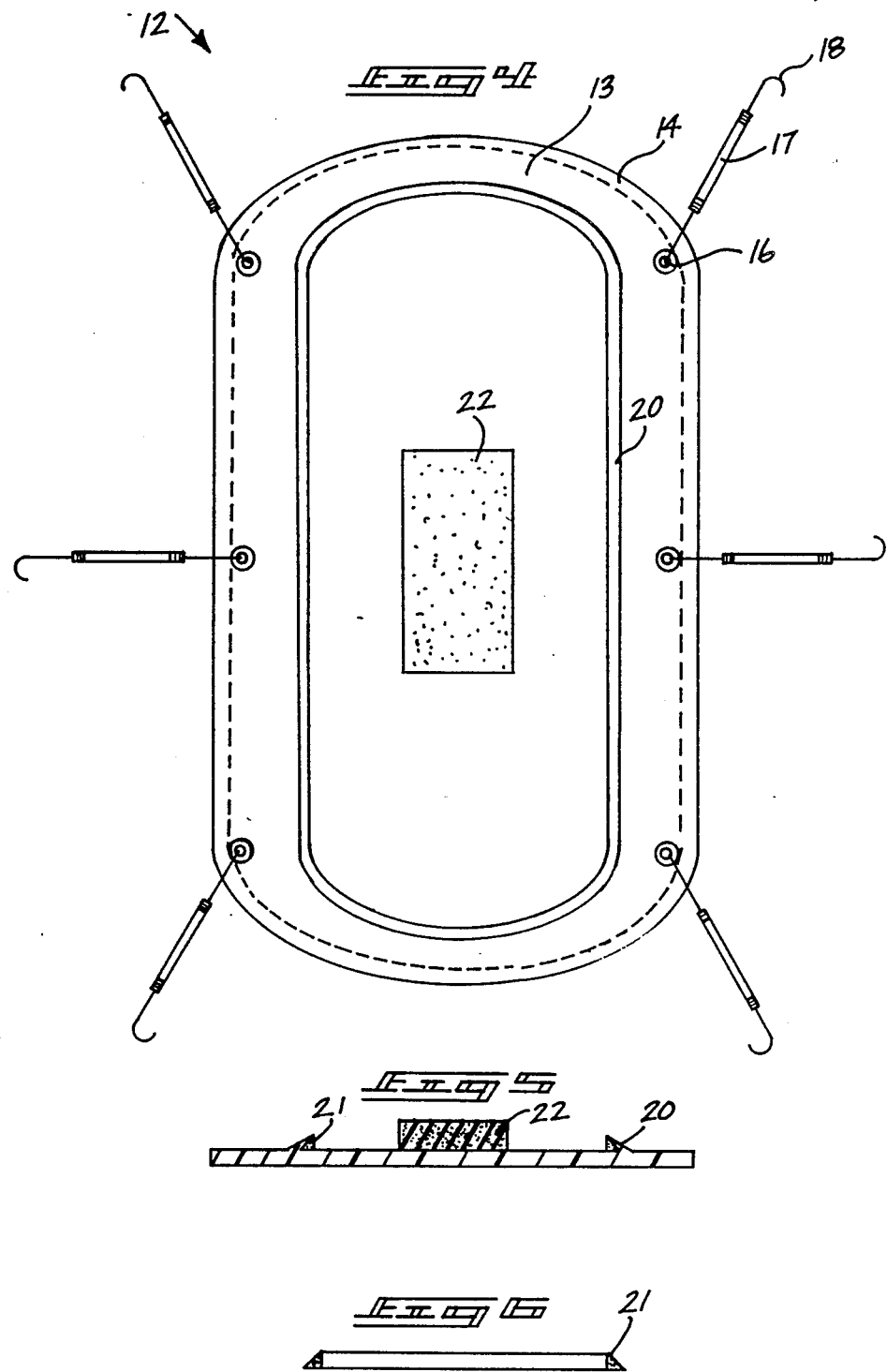

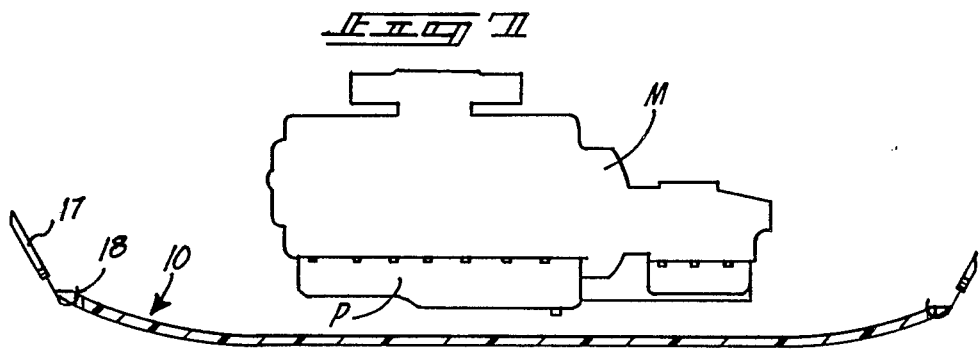
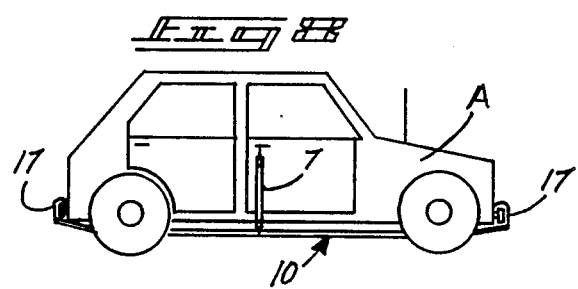

OIL DRIP COLLECTOR

BACKGROUND OF THE INVENTION

1. Field of the Invention

The field of invention relates to oil drip collectors, and more particularly pertains to a new and improved oil drip collector wherein the same is organized and arranged for securement underlying an automobile in association with an automotive engine for the collection and containment of oil drips directed therefrom.

2. Description of the Prior Art

Various devices have been provided in the prior art to contain waste oil that is directed from an automobile engine during an oil change procedure. Such oil is typically hazardous to the environment and its complete collection is desired during such oil changing procedures. Oil drip collectors of the past have been of either rigid or incomplete organizations to prevent their convenient and complete collection of waste oil directed from an overlying engine. For example, Savron U.S. Pat. No. 4,084,655 sets forth a rigid oil drip collector wherein the same is arranged for securement relative to an associated automobile framework with a rearwardly oriented drain plug. The collector of &he Savron paten& is of a relatively remote organization relative to the instant invention in its rigid and fixedly positioned orientation relative to an associated automobile.

Dorris U.S. Pat. No. 8,651,884 forth an oil drip guard utilizing an elongate, rigid collector member arranged for securement underlying a vehicular engine and is maintained in a state of compressional stress to prevent vibrations, as well as providing a protective shield to an engine arrangement.

Hartkemeyer U.S. Pat. No. 4,684,562 utilizes a series of sheets of various configurations to underlie an engine for absorption of oil directed therefrom. The device is positioned as a mat underlying the engine for the containment of such oil.

Clapper U.S. Pat. No. 4,497,147 sets forth a drip containing mat to underlie a vehicle to capture oil drippings therefrom. A blotter arrangement is provided for replacement with an indicator for indication of such replacement.

Jensen U.S. Pat. No. 4,695,088 sets forth an oil collector formed of a one-piece rigid plastic unit with a central recess with magnets formed within outwardly directed arms therefrom to retain oil within the central recess.

As such, it may be appreciated that there is a continuing need for a new and improved oil drip collector which addresses both the problems of convenience of use and effectiveness in organization, and in this respect, the present invention substantially fulfills this need.

SUMMARY OF THE INVENTION

In view of the foregoing disadvantages inherent in the known types of oil drip collectors now present in the prior art, the present invention provides an oil drip collector wherein the same is set forth as a flexible, elongate sheet to underlie a vehicle for temporary and resilient securement of the sheet to the vehicle during an oil change procedure. As such, the general purpose of the present invention, which will be described subsequently in greater detail, is to provide a new and improved oil drip collector which has all the advantages of the prior art oil drip collectors and none of the disadvantages.

To attain this, the present invention includes an elongate, oval sheet formed of flexible impermeable material provided with a reinforced edge with through-extending apertures formed in pairs aligned with one another at opposed sides of the sheet with a spring clip associated with each aperture and a hook portion of each clip provided for securement about an associated automobile. The sheet may be fur&her formed with a continuous oil containing ridge directed upwardly and downwardly from opposed upper and lower surfaces of the sheet for containment of oil centrally of the sheet. A further modification of the invention includes an upwardly extending lip directed inwardly of the sheet defining an acute angle between the sheet and the lip with a replacement sponge of a triangular cross-sectional configuration selectively contained within the lip. The sheet may be further formed with an adhesively securable central sponge to provide a central oil collecting repository medially of the sheet.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved oil drip collector which has all the advantages of the prior art oil drip collectors and none of the disadvantages.

It is another object of the present invention to provide a new and improved oil drip collector which may be easily and efficiently manufactured and marketed.

It is a further object of the present invention to provide a new and improved oil drip collector which is of a durable and reliable construction.

An even further object of the present invention is to provide a new and improved oil drip collector which is susceptible of a low cost of manufacture with regard to both materials and labor, and which accordingly is then susceptible of low prices of sale to the consuming public, thereby making such oil drip collectors economically available to the buying public.

Still yet another object of the present invention is to provide a new and improved oil drip collector which provides in the apparatuses and methods of the prior art some of the advantages thereof, while simultaneously overcoming some of the disadvantages normally associated therewith Still another object of the present invention is to provide a new and improved oil drip collector wherein the same may be positioned underlying a vehicular organization for containment of oil drippings directed downwardly therefrom.

These together with other obbjects of the invention, along with the various features of novelty which characterize the invention, are pointed out with particularity in the claims annexed to and forming a part of this disclosure. For a better understanding of the invention its operating advantages and the specific objects attained by its uses, reference should be had to the accompanying drawings and descriptive matter in which there is illustrated preferred embodiments of the invention.

BRIEF DESCRIPTION OF THE DRAWING

The invention will be better understood and objects other than those se& forth above will become apparent when consideration is given to the following detailed description thereof. Such description makes reference to the annexed drawings wherein FIG. 1 is a top orthographic view of a first embodiment of the instant invention.

FIG. 2 is a top orthographic view of a second embodiment of the instant invention.

FIG. 3 is a cross-sectional orthographic view of FIG. 2.

FIG. 4 is a top orthographic view of yet a further embodiment of the instant invention.

FIG. 5 is a cross-sectional orthographic view of the embodiments set forth in FIG. 4.

FIG. 6 is a cross-sectional orthographic view of the sponge insert utilized in the embodiments set forth in FIGS. 4 and 5.

FIG. 7 is an orthographic illustration of the instant invention directed underlying an associated automotive engine.

FIG. 8 is an orthographic view taken in elevation of the instant invention secured in association with an associated automobile during an oil change procedure.

DESCRIPTION OF THE PREFERRED EMBODIMENT

With reference now to the drawings, and in particular to FIGS. 1 to 8 thereof, a new and improved oil drip collector embodying the principles and concepts of the present invention and generally designated by &he reference numerals 10, 11, and 12 will he described.

More specifically, the oil drip collector apparatus 10 essentially comprises a flexible, elongate sheet 13 of a generally oval configuration formed of material generally impervious to fluid. The sheet 13 includes a reinforced periphery 14 with a series of apertures positioned adjacent and contiguous with the periphery. The apertures include a first series of reinforced apertures 15 adjacent a first side of the sheet aligned with and opposed to a series of second reinforced apertures 16 positioned on the second side of the sheet, as illustrated in FIG. 1. The apertures each receive a spring clip 17 formed With a medially oriented coil spring with a "U" shaped end portion 18 formed at each terminal end of the clip for securement about various structural portions of an automobile, as illustrated in FIG. 8, to contain and position the sheet underlying the automobile "A" underlying the motor "M" and the oil pan "P", as illustrated in FIG. 7.

Reference to FIG. 2 is illustrative of a first modification 11 of the oil drip collector apparatus wherein a continuous molded, elastomeric rim 18 extends outwardly and orthogonally relative to respective upper and lower opposed surfaces of the sheet to provide a confinement reservoir centrally of the sheet to prevent extensive oil from escaping the sheet during its use. The elastomeric nature of the rim 19 enables the rim to accommodate various geometric orientations of the sheet relative to the automobile "A". Further it should be noted that the rim 19 projecting from both upper and lower surfaces of the sheet enables the sheet to provide a reversible organization to utilize either upper or lower surfaces selectively as a drip collecting organization.

Reference to FIG. 4 illustrates a second modification 12 of the oil drip collector apparatus with a continuous inwardly directed lip 20 defining an acute angle between the lip 20 and upper surface of the sheet 18. Selectively positioned between the lip and the upper surface of the sheet is a removable sponge ring 21 of a triangular cross-sectional configuration with a lip confronting hypotenuse of the triangular cross-sectional configuration substantially equal in length to the length of the lip 20. The removable sponge ring 21, as illustrated in FIGS. 5 and 6, is selectively receivable and removable for periodic cleansing of the lip to enable repetitive use thereof. Further formed medially of the upper surface of the sheet 13 within the central reservoir formed by the lip 20 and the ring 21 is a central absorbent sponge block 22 of a generally rectangular parallelepiped configuration to provide an additional oil and fluid absorbing medium in addition to the reservoir defined by the aforenoted lip 20 and ring 21.

In use, it is understood that the sheet 13 is positioned to underlie an associated automotive engine and automobile, as illustrated in FIGS. 7 and 8, with the spring clips enabling securement to convenient portions of the automotive and engine structure in an adjustable manner. Subsequent to its use, the apparatus is merely removed relative to the automobile, cleansed and stored for a subsequent use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An oil drip collector apparatus for securement underlying a vehicle containing an oil lubricated engine, the apparatus comprising, an elongate flexible sheet including a reinforced perimeter edge, and plural pairs of apertures positioned contiguously with the edge through the sheet, and a clip member operably associated with each aperture for securement of the sheet to structural portions of the vehicle during an oil change procedure, and wherein each of the clips includes a medially oriented coil spring with a "U" shaped hook formed at each terminal end of the clip with a first "U" shaped hook directed through an associated aperture and a second "U" shaped hook for securement to the structural portions of the vehicle, and wherein the flexible sheet is formed of a flexible and fluid impermeable material, and wherein the flexible sheet includes a continuous elastomeric rim positioned interiorly of the perimeter edge and integrally molded to upper and lower surfaces of the sheet with upper and lower portions of the rim relative to one another, and the rim surroundingly defining a central reservoir within upper and lower surfaces of the sheet.

2. An oil drip collector apparatus for securement underlying a vehicle containing an oil lubricated engine, the apparatus comprising, an elongate flexible sheet including a reinforced perimeter edge, and plural pairs of apertures positioned contiguously with the edge through the sheet, and a clip member operably associated with each aperture for securement of the sheet to structural portions of the vehicle during an oil change procedure, and wherein each of the clips includes a medially oriented coil spring with a "U" shaped hook formed at each terminal end of the clip with a first "U" shaped hook directed through an associated aperture and a second "U" shaped hook for securement to the structural portions of the vehicle, and wherein the flexible sheet is formed of a flexible and fluid impermeable material, and further including a continuous inwardly directed lip spaced interiorly of the perimeter edge and integrally secured and formed to an upper surface of the sheet, and the lip defining an acute angle between an upper surface of the sheet and the lip.

3. An oil drip collector apparatus as set forth in claim 2 wherein the lip further includes a removable continuous sponge ring of a cross-sectional configuration receivable between the lip and an upper surface of the sheet.

4. An oil drip collector apparatus as set forth in claim 3 wherein the lip is of a predetermined length and is substantially equal to a hypotenuse defined by the ring.

5. An oil drip collector apparatus as set forth in claim 4 wherein the lip defines a central reservoir medially of the sheet and wherein a central absorbent sponge block is secured medially of the reservoir upon an upper surface of the sheet.

6. An oil drip collector apparatus as set forth in claim 5 wherein the sheet is of a generally oval configuration.

* * * * *